United States Patent [19]

Okano et al.

[11] Patent Number: 4,758,616
[45] Date of Patent: Jul. 19, 1988

[54] THERMOPLASTIC POLYESTER COMPOSITION FOR POWDERED PAINT

[75] Inventors: Tatsuro Okano, Narashino; Hirofumi Eguchi, Nagoya, both of Japan

[73] Assignees: Toray Industries, Inc., Tokyo; Seitetsu Kagaku Co., Hyogo, both of Japan

[21] Appl. No.: 897,491

[22] Filed: Aug. 15, 1986

[30] Foreign Application Priority Data

Aug. 22, 1985 [JP] Japan .................................. 60-184610

[51] Int. Cl.$^4$ .............................................. C08L 67/02
[52] U.S. Cl. ..................................... 524/399; 524/400; 524/445; 524/447; 524/451; 524/605; 525/174; 525/446; 528/302; 528/305
[58] Field of Search ................ 525/446; 524/451, 605, 524/399, 400, 445, 447; 528/302, 305

[56] References Cited

U.S. PATENT DOCUMENTS

| | | | |
|---|---|---|---|
| 3,853,665 | 12/1974 | Gardziella | 524/601 |
| 3,861,915 | 1/1975 | Cawley | 525/446 |
| 4,012,363 | 3/1977 | Bruning | 528/308 |
| 4,094,721 | 6/1978 | Sturm | 156/309 |
| 4,173,658 | 11/1979 | Bax | 427/27 |
| 4,471,109 | 9/1984 | Watase | 528/272 |

*Primary Examiner*—Patricia Short
*Attorney, Agent, or Firm*—Austin R. Miller

[57] ABSTRACT

A thermoplastic polyester composition for a powdered paint which comprises:
(a) a copolyester derived from a dicarboxylic acid component comprising 40 to less than 60 molar % of terephthalic acid and a diol component comprising at least 70 molar % of 1,4-butanediol and having a melting point determined by differential thermal analysis of 100° to 150° C.,
(b) a nucleating agent, and
(c) a leveling agent.

This composition can be applied with a lowered preheat temperature and a lowered heat setting temperature and can form a coating film having an excellent adhesion, a good appearance and a high impact resistance.

6 Claims, No Drawings

THERMOPLASTIC POLYESTER COMPOSITION FOR POWDERED PAINT

BACKGROUND OF THE INVENTION

The present invention relates to a thermoplastic polyester composition which is particularly useful as a raw material for a powdered paint.

Powder coating has advantages in that no solvent is required to result in less environmental pollution, that a coating material can be recovered and re-used and, that a coating film having a thickness of 50 to 700 μm can be formed in one coating step and is now acquiring wide acceptances. A thermoplastic polyester resin, however, has hardly been put to practical use as a powdered paint in spite of its high adhesion and excellent weathering resistance. The present invention provides a thermoplastic polyester resin composition which can afford a coating film having a high adhesion, a good state of surface and a high impact resistance under mild coating conditions.

Up to this time, a thermosetting polyester has been used as a raw material for a powdered paint mainly together with an epoxy, isocyanate or melamine compound. On the other hand, it is also known that a thermoplastic polyester resin is useful as a material for fluidized bed dip coating or electrostatic powder coating. Known processes include, for example, a process wherein a mixture of a polyester selected from among poly(neopentyl terephthalate), copolyester of 1,4-dihydroxymethylcyclohexane with terephthalic and isophthalic acids and a celullose compound such as acetylcellulose is used as described in Japanese Patent Laid-Open No. 97023/1974, a process wherein polyethylene iso/terephthalate containing isophthalic acid component in an amount of 8 to 20 molar % is used as described in Japanese Patent Laid-Open No. 41367/1984, and a process wherein polyester derived from 1,4-butanediol and terephthalic acid and having a specified composition and specified physical properties is used as described in Japanese Patent Laid-Open No. 56424/1975.

These known processes aim at overcoming a problem that a thermoplastic polyester resin exhibits a poor adhesion to a substrate, causes cracks when rapidly cooling or bending and gives a poorly lustrous surface in spite of its excellent characteristics as a coating material such as weathering resistance.

Thus, the process described in the Japanese Patent Laid-Open No. 97023/1974 relates to an improvement in gloss of the surface of a coating film which comprises adding a large amount of a cellulose compound to a polyester having a specified composition. The process described in the Japanese Patent Laid-Open No. 56424/1984 relates to an improvement in adhesion to a substrate and in bending processability which comprises using a copolyester obtained by copolymerizing isophthalic acid with polyethylene terephthalate in a specified ratio.

However, these improvements cannot give a sufficient effect to be used as a powdered paint. Especially the adhesion, impact resistance and the like thus improved are still far from levels for practical use.

Furthermore, the process described in the Japanese Patent Laid-Open No. 56424/1975 relates to an improvement in the above disadvantages which comprises specifying the composition of monomers and the physical properties.

Although the above known methods have improved various disadvantages, they have still disadvantages in that the impact resistance, particularly the thermal shock resistance in a heating-colling cycle is low and that the substrate to be coated by the fluidized bed dip coating method must be heated to 250° C. or above. Consequently, they must be further improved to be put to practical use.

SUMMARY OF THE INVENTION

An object of the present invention is to provide a thermoplastic polyester composition for powdered paint having an improved adhesion to a substrate, impact resistance and surface characteristics, which are important factors to be considered in covering a metallic surface by powder coating.

Another object of the present invention is to provide a thermoplastic polyester composition for powdered paint which can be applied with a lowered pre-heat temperature of a substrate and a lowered heat setting temperature, which are important requisites in the powder coating step.

The thermoplastic polyester composition for powdered paint according to the present invention comprises the following components (a), (b) and (c):

(a) a copolyester derived from a dicarboxylic acid component comprising 40 to less than 60 molar % of terephthalic acid and a diol component comprising at least 70 molar % of 1,4-butanediol and having a melting point determined by differential thermal analysis of 100° to 150° C., (b) a nucleating agent, and (c) a leveling agent.

DESCRIPTION OF THE PREFERRED EMBODIMENTS

The dicarboxylic acid component to be used in the preparation of the copolyester (a) must contain 40 to less than 60 molar %, preferably 45 to 55 molar %, of terephthalic acid. The residual dicarboxylic acid component may be an aromatic dicarboxylic acid such as isophthalic acid, an aliphatic acid having 6 to 12 carbon atoms such as adipic, sebacic, azelaic or dodecanedioic acid, an ester thereof or a mixture thereof.

If the content of terephthalic acid is 60 molar % or above, the crystallization rate will be enhanced to shorten a coating cycle, but the impact resistance such as heat shock resistance will be lowered, which is not preferred. On the contrary, if it is less than 40 molar %, the obtained resin will have too low a melting point and will exhibit a remarkably lowered crystallization rate, thus difficulty giving a practical coating film.

The glycol component to be used must contain at least 70 molar %, preferably at least 80 molar %, of 1,4-butanediol. The residual diol component may be a saturated aliphatic diol having 2 to 12 carbon atoms such as ethylene glycol, 1,6-hexanediol or neopentyl glycol or a mixture thereof.

If the amount of 1,4-butanediol is less than 70 molar %, the crystallizability will be so lowered that the coating film will exhibit a remarkably lowered crystallization rate and will be too soft to keep a required hardness.

The copolyester (a) must have not only the above defined monomer components but also a melting point determined by differential thermal analysis of 100° to 150° C., preferably 110° to 140° C.

If the melting point peak is lower than 100° C., the obtained coating film will exhibit a poor state of the surface after cooling and too poor a heat resistance to be practically used, although it will be possible to lower the heat setting temperature.

On the contrary, if the melting point exceeds 150° C., a high heat setting temperature of 250° C. or above will be required, so that the lowering in heat setting temperature, which is one of the objects of the present invention, will be difficultly attained. Accordingly, if a composition containing a polyester resin having such a high melting point is baked at a low temperature, the adhesion and heat shock resistance will be low, while if such a composition is baked at a high temperature, the resin will easily be degraded, so that the inherent characteristics will hardly be exhibited.

Further, the composition according to the present invention must contain a nucleating agent and a leveling agent as well as the above copolyester. Thus is because the above copolyester resin having the specified composition and the specified characteristics cannot attain the objective improvement without a combined use of a nucleating agent and a leveling agent.

The nucleating agent to be used may be any one which is ordinarily used in the molding of a polyester resin such as, aluminum or barium stearate, talc, kaolin or clay, but the effect is remarkably variable depending upon the kind or grade of the agent.

An ultrafine talc powder having a median diameter of 4 μm or below is most effective in the present invention.

The amount of the nucleating agent used is preferably 0.01 to 1 part by weight per 100 parts by weight of the copolyester used. If the amount of the nucleating agent is less than 0.01 part by weight, the accelerating effect will be insufficient, while if the amount exceeds 1 part by weight, the crystallization will proceed to such an extent that the impact resistance or the adhesion will be lowered, which is not preferred.

The leveling agent to be used in the present invention may be a silicone resin, fluoroethylene resin or the like.

However, a leveling agent comprising an acrylic copolymer and silica powder (commercially available under a resistered tradename of MODAFLOW® by Monsanto Co.) is the most effective in maintaining the smoothness and adhesion of the coating film. The amount of the leveling agent used is preferably 0.05 to 2 parts by weight per 100 parts by weight of the copolyester used. If the amount is less than 0.05 part by weight, no sufficient leveling effect will be attained, while if it is more than 2 parts by weight, no sufficient adhesion will be attained, which is not preferred.

The disadvantages of the prior arts can be overcome by satisfying all of the above-described requirements, thus affording a thermoplastic polyester composition which can be applied by a powder coating with a preheating temperature and a heat setting temperature lower than those of the prior arts to give a coating film having a high adhesive strength to a substrate, a high heat shock resistance and an excellent surface.

The copolyester which is a main component of the composition according to the present invention can be prepared by an ordinary process for preparing a known polyethylene terephthalate. A representative process therefor will now be described.

A mixture comprising dimethyl terephthalate, dimethyl isophthalate and, if necessary, fatty acid dimethyl ester (such as adipate) and having a specified molar ratio is reacted with 1,4-butanediol in the presence of an ester exchange catalyst such as zinc acetate at a temperature of 150° to 220° C. in an autoclave fitted with a stirrer to carry out the ester exchange reaction with the generation of methanol. A polymerization catalyst such as antimony trioxide is added. The reaction system is gradually evacuated, heated and subjected to glycol elimination reaction at 270° C. under a vacuum of 0.5 mmHg or below until a specified degree of polymerization is attained. Nitrogen gas is introduced into the autoclave to terminate the reaction. The prepared polymer is taken out from the bottom of the autoclave, cooled with water and cut into a specified size.

A talc having a median diameter of 1.5 to 3 μm (for example, "MICRON WHITE®" and "MICELTONE®", both of which are products of Hayashi Kasei Co., Ltd., are preferred) and a leveling agent comprising a silica-containing acrylic copolymer (for example, "MODAFLOW®" is preferred) and, a pigment such as titanium oxide and, if necessary, other additives such as weathering stabilizer are added to the obtained copolymer. The resulting mixture is sufficiently premixed in a high-speed mixer and homogeneously mixed in an extruder.

The obtained mixture was cooled with liquid nitrogen, pulverized with a pulverizer and classified to obtain a powdered paint having a particle size of 60 to 300 μm which is suitable for powder coating.

This paint may be applied by fluidized bed dip coating or electrostatic powder coating.

Typically, a substrate is preheated to 250° to 300° C. for several minutes, dipped in the fluidized bed of this paint for several seconds, heated at 180° to 200° C. for several minutes and cooled gradually or rapidly to obtain a coated article.

EXAMPLE

Now, the present invention will be described in more detail by referring to Examples.

In the Examples, the obtained coated articles were examined and evaluated according to the following methods.

Adhesive strength: A coated article was notched at intervals of 25 mm and at a depth coming to the surface of a substrate and examined for 180° peel strength with a pulling rate of 50 mm/min. The term "unstrippable" means that the coating film has too high adhesive strength to peel.

Hardness of surface: The hardness was determined according to JIS K-7215 and is shown in terms of Shore hardness D.

Thermal shock test: A coated article was subjected to a heat cycle test comprising repeating up to 20 times a cycle which comprises heating at 90° C. for one hour and cooling at −30° C. for one hour with a thermal shock tester (TSC-10A: a product of Tabai Espec Co. Ltd.) and observed for the generation of crack.

Du Pont impact: A coated article was examined according to JIS K-5400 B method with 1000 g×50 cm.

Gloss: The gloss of a coated article was observed with the naked eyes and evaluated according to the following criteria:

O: excellent, Δ: insufficient, x: bad

State of surface: The smoothness of the surface was evaluated with the naked eyes and fingers.

EXAMPLES 1 TO 20

An acid component comprising 50 molar % of terephthalic acid and 50 molar % of isophthalic acid was reacted with a glycol component comprising 100 molar % of 1,4-butanediol to obtain a copolyester having a melting point determined by differential thermal analysis of 132° C. and an intrinsic viscosity of 0.80 cc/g.

10 parts by weight of titanium dioxide (as a pigment), a given amount of talc having a median diameter of 1.5 μm and a given amount of MODAFLOW (as a leveling agent) were added to 100 parts by weight of this copolyester. The resulting mixture was homogeneously mixed and pulverized to obtain a powdered paint having an average particle size of 150 μm. Separately, talc having a median diameter of 1.5 μm and MODAFLOW (as a leveling agent) were added each in a given amount to the above copolyester. The obtained mixture was homogeneously mixed and pulverized to obtain a powder having an average particle size of 150 μm. 1 part by weight of a black pigment was added to this powder. The resulting mixture was sufficiently mixed to obtain another powdered paint.

A cold-rolled steel plate (70×150×2 mmt) or a spot welded wire material (3, 4 or 5 mm φ) was preheated at a given temperature for 15 minutes, coated with the above powdered paint by fluidized bed dip coating and post-heated at 180° C. for 2 minutes. The resulting coated article was evaluated.

The compositions of the powdered paints are shown in Table 1, while the evaluation results are shown in Table 2.

TABLE 1

| Composition | Content of talc (parts by weight) | Content of MODAFLOW (parts by weight) | Content of pigment (parts by weight) |
|---|---|---|---|
| A | 0.1 | 0.1 | TiO₂ 10 |
| B | 0.1 | 0.5 | " |
| C | 0.1 | 1.0 | " |
| D | 0.05 | 0.5 | " |
| E | 0.3 | 0.5 | " |
| F | 0.5 | 0.5 | " |
| G | 0.05 | 0.5 | black pigment 1 |
| H | 0.1 | 0.1 | " |

TABLE 2

Coating conditions and evaluation results of coated articles

| Example No. | Composition | Substrate | Preheat temp. (°C.) | State of surface (smoothness) | Gloss | Adhesive strength (180° peel) | Hardness (Shore-D) | Du Pont impact (falling distance) | Thermal shock (times of heating and cooling cycle) |
|---|---|---|---|---|---|---|---|---|---|
| 1 | A | steel plate | 250 | excellent | O | unstrippable | 65 | ≧50 cm | ≧20 |
| 2 | A | wire material | " | " | O | " | " | — | " |
| 3 | B | steel plate | " | " | O | " | " | ≧50 cm | " |
| 4 | B | wire material | " | " | O | " | " | — | " |
| 5 | C | steel plate | " | " | O | " | " | ≧50 cm | " |
| 6 | C | wire material | " | " | O | " | " | — | " |
| 7 | D | steel plate | " | " | O | " | " | ≧50 cm | " |
| 8 | D | wire material | " | " | O | " | " | — | " |
| 9 | E | steel plate | " | " | O | " | " | ≧50 cm | " |
| 10 | E | wire material | " | " | O | " | " | — | " |
| 11 | F | steel plate | " | " | O | " | " | ≧50 cm | " |
| 12 | F | wire material | " | " | O | " | " | — | " |
| 13 | G | steel plate | " | " | O | " | " | ≧50 cm | " |
| 14 | G | wire material | " | " | O | " | " | — | " |
| 15 | H | steel plate | " | " | O | " | " | ≧50 cm | " |
| 16 | H | wire material | " | " | O | " | " | — | " |
| 17 | B | steel plate | 200 | " | O | " | " | ≧50 cm | " |
| 18 | B | wire material | " | " | O | " | " | — | " |
| 19 | B | steel plate | 220 | " | O | " | " | ≧50 cm | " |
| 20 | B | wire material | " | " | O | " | " | — | " |

EXAMPLES 21 TO 30

An acid component selected from among ones comprising 40 to 55 molar % of terephthalic acid, 20 to 35 molar % of isophthalic acid and 5 to 15 molar % of adipic acid was reacted with a glycol component selected from among ones comprising 70 to 100 molar % of 1,4-butanediol and 0 to 30 molar % of ethylene glycol to obtain a copolyester having an average intrinsic viscosity of about 0.8 cc/g.

10 parts by weight of titanium dioxide as a pigment, 0.1 part by weight of talc having a median diameter of 1.5 μm and 0.5 part by weight of MODAFLOW were added to 100 parts by weight of this copolyester. The obtained mixture was homogeneously mixed and pulverized to obtain a powdered paint having an average particle size of about 150 μm.

A cold-rolled steel plate (70×150×2 mmt) or a spot welded wire material (3, 4 or 5 mm φ) was preheated at 200° or 250° C. for 15 minutes, coated with the above powdered paint by fluidized bed dip coating and post-heated at 180° C. for 2 minutes to obtain a coated article.

The compositions of the coating resin are shown in Table 3, while the evaluation results are shown in Table 4.

TABLE 3

Monomer compositions of the coating resin

| Composition | Acid component (molar %) | | | Glycol component (molar %) | | Melting point (°C.) |
|---|---|---|---|---|---|---|
| | terephthalic acid | isophthalic acid | adipic acid | 1,4-butanediol | ethylene glycol | |
| I | 45 | 45 | 10 | 100 | 0 | 112 |

TABLE 3-continued

| | Monomer compositions of the coating resin | | | | | |
|---|---|---|---|---|---|---|
| | Acid component (molar %) | | | Glycol component (molar %) | | |
| Composition | terephthalic acid | isophthalic acid | adipic acid | 1,4-butanediol | ethylene glycol | Melting point (°C.) |
| J | 50 | 45 | 5 | 90 | 10 | 115 |
| K | 55 | 45 | 0 | 100 | 0 | 145 |
| L | 58 | 37 | 5 | 70 | 30 | 125 |

TABLE 4

| | | | | Evaluation results of coated articles | | | | | |
|---|---|---|---|---|---|---|---|---|---|
| Example No. | Composition | Substrate | Preheat temp. | State of surface (smoothness) | Gloss | Adhesive strength (180° peel) | Hardness (Shore-D) | Du Pont impact (falling distance) | Thermal shock (times of heating and cooling cycle) |
| 21 | I | steel plate | 250 | excellent | O | unstrippable | 60 | ≧50 cm | ≧20 |
| 22 | I | wire material | " | " | O | " | " | — | " |
| 23 | J | steel plate | " | " | O | " | 65 | ≧50 cm | " |
| 24 | J | wire material | " | " | O | " | " | — | " |
| 25 | K | steel plate | " | " | O | " | 70 | ≧50 cm | " |
| 26 | K | wire material | " | " | O | " | " | — | " |
| 27 | L | steel plate | " | " | O | " | 65 | ≧50 cm | " |
| 28 | L | wire material | " | " | O | " | " | — | " |
| 29 | J | steel plate | 200 | " | O | " | " | ≧50 cm | " |
| 30 | J | wire material | " | " | O | " | " | — | " |

COMPARATIVE EXAMPLES 1 TO 9

An acid component given in Table 5 was reacted with glycol component given in the same table to prepare a copolymer having an average intrinsic viscosity of 0.7 to 0.8 cc/g. 10 parts by weight of titanium dioxide, 0 to 0.1 part by weight of talc having a given grade and 0 to 0.5 part by weight of MODAFLOW were added to 100 parts by weight of the above copolyester. The resulting mixture was homogeneously mixed sand pulverized to obtain a powdered paint having an average particle size of 150 μm.

A cold-rolled steel plate (70×150×2 mmt) was preheated at 250° C. for 15 minutes, coated with the above powdered paint and post-heated at 180° C. for 2 minutes.

The monomer compositions of the coating resin are shown in Table 5, while the evaluation results of coated articles are shown in Table 6.

TABLE 5

| | Monomer compositions of the coating resin | | | | | |
|---|---|---|---|---|---|---|
| | Acid component (molar %) | | | Glycol component (molar %) | | |
| Composition | terephthalic acid | isophthalic acid | residual component | 1,4-butanediol | ethylene glycol | Melting point (°C.) |
| M | 65 | 30 | adipic acid 5 | 100 | 0 | 170 |
| N | 70 | 30 | adipic acid 0 | 90 | hexanediol 10 | 166 |
| O | 34 | 33 | sebacic acid 33 | 100 | 0 | 75 |
| P | 75 | 25 | sebacic acid 0 | 50 | hexanediol 50 | 100 |

TABLE 6

| | | Evaluation results of coated article | | | | | | | |
|---|---|---|---|---|---|---|---|---|---|
| Comparative Example No. | Composition | Additive (parts by weight) | | State of surface (smoothness) | Gloss | Adhesive strength (180° peel) | Hardness (Shore-D) | Du Pont impact (falling distance) | Thermal shock (times of heating and cooling cycle) |
| | | talc*¹ | MODAFLOW | | | | | | |
| 1 | M | 0 | 0 | insufficient | Δ | unstrippable | 70 | ≦20 cm | ≦15 |
| 2 | M | 0 | 0.5 | excellent | O | " | " | " | " |
| 3 | N | 0 | 0 | insufficient | Δ | strippable | 75 | ≦10 cm | " |
| 4 | O | 0.1 | 0.5 | bad | X | unstrippable | 30 | ≧50 cm | ≧20 |
| 5 | P | 0 | 0 | insufficient | Δ | strippable | 70 | ≦10 cm | ≦15 |
| 6 | B | 0 | 0 | bad | X | unstrippable | 50 | ≧50 cm | ≧20 |
| 7 | B | 0 | 0.5 | insufficient | Δ | " | " | " | " |
| 8 | B | 0.1 | 0 | bad | X | " | " | " | " |
| 9 | B | 0.1 | 0.5 | excellent | O | " | 55 | " | " |

*Note
¹Any of the talcs used was an ultrafine talc particle having a median diameter of 1.5 μm except for that of comparative Example 9 (having a median diameter of 10 μm).

What is claimed is:

1. A powdered paint comprising:
(a) 100 parts by weight of copolyester derived from a dicarboxylic acid component comprising 40 to less than 60 molar % of terephthalic acid, 30 to 60 molar % of isophthalic acid and 0 to 10 molar % of another organic dicarboxylic acid and a diol component comprising at least 70 molar % of 1,4-butanediol having a melting point determined by differential thermal analysis of 100° to 150° C.,
(b) 0.01 to 1 part by weight of a nucleating agent,
(c) 0.05 to 2 parts by weight of a leveling agent and
(d) an effective amount of a pigment.

2. A powdered paint as defined in claim 1, wherein said copolyester is one derived from a dicarboxylic component comprising 45 to 55 molar % of terephthalic acid and a diol component comprising at least 80 molar % of 1,4-butanediol and having a melting point determined by differential thermal analysis of 110° to 140° C.

3. A powdered paint as set forth in claim 1, wherein said other organic dicarboxylic acid is an aliphatic dicarboxylic acid having 6 to 12 carbon atoms.

4. Powdered paint as defined in claim 1, wherein said nucleating agent is selected from the group consisting of aluminum stearate, barium stearate, kaolin, talc and clay.

5. A powdered paint as defined in claim 1, wherein said nucleating agent is an ultrafine powder having a median diameter of 4 μm or below.

6. A powdered paint as set forth in claim 1, wherein said leveling agent is selected from the group consisting of silicone resins, fluoroethylene resins and acrylic resins.

* * * * *